United States Patent
Fischer (10) Patent No.: US 9,772,205 B2
(45) Date of Patent: Sep. 26, 2017

(54) METHOD FOR ELECTRONICALLY ACTIVATING A MEASUREMENT STAND, AND MEASUREMENT STAND FOR SUPPORTING A MEASURING PROBE

(71) Applicant: Helmut Fischer GmbH Institut fur Elektronik und Messtechnik, Sindelfingen (DE)

(72) Inventor: Helmut Fischer, Oberageri (CH)

(73) Assignee: Helmut Fischer GmbH Institut für Elektronik und Messtechnik, Sindelfingen (DE)

( * ) Notice: Subject to any disclaimer, the term of this patent is extended or adjusted under 35 U.S.C. 154(b) by 373 days.

(21) Appl. No.: 14/617,349

(22) Filed: Feb. 9, 2015

(65) Prior Publication Data
US 2015/0226586 A1    Aug. 13, 2015

(30) Foreign Application Priority Data
Feb. 7, 2014  (DE) .................... 10 2014 101 577

(51) Int. Cl.
G01B 7/06      (2006.01)
G01D 11/30     (2006.01)
G01B 5/06      (2006.01)

(52) U.S. Cl.
CPC .............. *G01D 11/30* (2013.01); *G01B 5/061* (2013.01); *G01B 7/06* (2013.01); *G01B 7/105* (2013.01)

(58) Field of Classification Search
CPC .......... G01B 5/061; G01B 7/06; G01B 7/105; G01D 11/30
(Continued)

(56) References Cited

U.S. PATENT DOCUMENTS 3,483,626 A * 12/1969 Huttel .................... G01B 3/008
                                                     33/549
4,521,967 A *  6/1985 Uchino .................. G01B 5/061
                                                     33/832
(Continued)

FOREIGN PATENT DOCUMENTS

DE        196 49 515 A1    6/1998
DE    10 2005 034 515 A1   1/2007
(Continued)

*Primary Examiner* — Christopher Fulton
(74) *Attorney, Agent, or Firm* — Renner, Otto, Boisselle & Sklar, LLP (57) ABSTRACT

A method for electrically activating a measurement stand with a movement of at least one measuring probe (26) from a starting position (31) into a measuring position (32) and also a measurement stand for supporting a measuring probe, in particular for measuring the thickness of thin layers, in which a motor (34) is activated by a control arrangement (25), which moves a ram (23) up and down via a drive arrangement (35), wherein a retainer (24) is provided on the ram (23), to which retainer the measuring probe (26) can be fastened, in which a freewheel is activated between the drive arrangement (35) and the ram (33) as soon as the measuring probe (26) or retainer (23) is set down in the measuring position (32) on an item to be measured (14) and the movement of the drive arrangement (35) is decoupled from the vertical movement of the ram (23), wherein a movement speed of the at least one measuring probe (14) from the starting position (31) into the measuring position (32) is reduced by mechanical damping or electrical damping before the measuring position (32) is reached.

28 Claims, 9 Drawing Sheets

(58) Field of Classification Search
USPC .......................................................... 33/834
See application file for complete search history.

(56) References Cited

U.S. PATENT DOCUMENTS

| | | | | |
|---|---|---|---|---|
| 4,924,598 A * | 5/1990 | Gruhler | ................ | G01B 5/061 33/503 |
| 4,928,517 A * | 5/1990 | Fitts | ..................... | G01B 5/28 73/105 |
| 5,305,646 A * | 4/1994 | Ashmore | ................ | G01B 5/30 73/818 |
| 5,929,633 A * | 7/1999 | Fischer | ................ | G01B 7/105 324/230 |
| 5,937,533 A * | 8/1999 | Meyer | .................. | G01B 3/008 33/832 |
| 6,011,391 A * | 1/2000 | Nix | ..................... | G01B 7/105 324/230 |
| 6,751,884 B2 * | 6/2004 | Jordil | .................. | G01B 5/061 33/832 |
| 6,813,845 B2 * | 11/2004 | Jordil | .................. | G01B 5/061 33/833 |
| 7,610,690 B2 * | 11/2009 | Fischer | .............. | G01B 5/0004 33/572 |
| 8,745,889 B2 * | 6/2014 | Fischer | .............. | G01B 5/0004 33/572 |

FOREIGN PATENT DOCUMENTS

| | | | |
|---|---|---|---|
| DE | 10 2010 011 633 A1 | 10/2010 | |
| GB | 1 108 792 A | 4/1968 | |
| GB | 1108792 A * | 4/1968 | ............. G01B 5/061 |
| GB | 2 319 847 A | 6/1998 | |
| GB | 2 468 766 A | 9/2010 | |

\* cited by examiner

METHOD FOR ELECTRONICALLY ACTIVATING A MEASUREMENT STAND, AND MEASUREMENT STAND FOR SUPPORTING A MEASURING PROBE

This application claims priority of German Patent Application No. 10 2014 101 577.0 filed Feb. 7, 2014, which is hereby incorporated herein by reference.

The invention relates to a method for activating a measurement stand with a movement of at least one measuring probe, which is transferred from a starting position into a measuring position, wherein the measuring probe is set down on an item to be measured, in particular in order to measure the thickness of thin layers. The invention also relates to a measurement stand for carrying out the method.

A measurement stand for supporting a measuring probe which is provided to measure the thickness of thin layers on an item to be measured is known from DE 10 2010 011 633 A1. This measurement stand comprises a measuring table and also a housing, which is arranged above the measuring table and which is held relative to the measuring table by means of a column. In this housing, a motor is provided, which drives a drive arrangement which is connected to a ram. The drive arrangement comprises a carriage, which is guided movably up and down along a guide, wherein a toothed belt is provided between the carriage and the motor in order to control the up and down movement of the carriage.

The ram comprises a retainer, to which a measuring probe can be fastened. A freewheel is provided between the ram and the drive arrangement and is activated as soon as the measuring probe is set down on the item to be measured, whereby the movement of the drive arrangement is decoupled from the vertical movement of the ram.

This measurement stand, following the execution of a learning routine and following the subsequent measurement of a distance between a starting position of the ram or of the measuring probe and a measuring position on the item to be measured, makes it possible to activate a vertical movement of the measuring probe in an exact manner, such that the vertical movement of the ram is first activated in a rapid mode and is then transferred into a creep mode. Due to the prior measurement and knowledge of the entire path of travel covered until the setdown of the measuring probe on the measurement surface, a reduction in speed is determined and achieved by way of calculation for a gentle setdown of the measuring probe. Such a measurement stand and a method for activating a vertical movement of the ram for setdown of the measuring probe on an item to be measured have proved their worth. Due to the ever-increasing requirements, it is necessary to develop further such a measurement stand and a method for activation thereof.

The object of the invention is to propose a measurement stand for supporting at least one measuring probe, and also at least one method for activating the measurement stand with a movement of at least one measuring probe, in particular in order to measure the thickness of thin layers, said measurement stand enabling a gentle setdown of the measuring probe on the measurement surface of the item to be measured and additionally being able to be ready for use for a new measurement task within a very short period of time.

This object is achieved by a method for electrically activating a measurement stand, in which a high movement speed of the at least one measuring probe from the starting position of the ram into the measuring position of the ram is reduced by a mechanical or electrical damping before this measuring position is reached, such that the measuring probe is set down gently with a reduced movement speed. The need to run through a learning routine beforehand is thus spared. Due to the reduction of the movement speed by means of the mechanical or electrical damping directly before the measuring position is reached or in a movement range before the measuring position is reached, a pre-settable speed reduction from a rapid mode from the starting position until the start of a damping region above the measuring position is achieved without the need for additional adjustment measures. It is made possible to move the measuring probe slowly towards the item to be measured and/or for the measuring probe to be set down gently on the item to be measured within the damping region. It is merely necessary for the measuring probe to be set to the height of the measuring position, wherein said measuring probe is preferably positioned in a lower end position with the drive arrangement, in order to carry out the measurements subsequently. A reduction in the time for the set-up or conversion of the measurement stand for new measurement tasks is thus achieved, thus increasing productivity.

A reduced movement speed compared with a first delivery speed is preferably activated by the damping within a predetermined damping region. The two movement speeds for activating the drive arrangement, which transfers the movement speeds to the vertical movement of the ram, is in turn pre-set and is determined in relation to one another in order to obtain a maximum time reduction for rapid or rough delivery and in order to set an optimised creep speed or reduced movement speed so that a gentle setdown of the probe on the measurement surface of the item to be measured is made possible without causing damage. An excessively hard setdown of the measuring probe can lead at the least to damage, in particular denting, of the layers at the surface of the item to be measured, and can falsify the measurement.

The reduced movement speed within the damping region is preferably kept constant. The motor can thus be activated in a simplified manner. Merely a switchover from a high movement speed, which also preferably is kept constant, into a reduced movement speed is necessary. What is known as a kinked curve can be achieved as a result, wherein the severity of the kink is determined by the ratio of the high movement speed to the reduced movement speed.

An electrical damping can preferably be performed by a voltage change in order to activate the motor or by a short circuit of the motor. By way of example, the motor can act as a generator following the short circuit and can counteract the high speed of travel in the rapid mode for braking. Depending on the voltage change or the moment of the short circuit, the profile of what is known as a kinked characteristic line can be determined, said line being composed of a characteristic line portion of the rapid mode and a second characteristic line portion of the creep mode.

Furthermore, a rapid rotational speed change of the motor can be activated for electrical damping.

The electrical damping can also be initiated by a signal of a sensor, which is positioned between an end switch arranged in the starting position of the drive arrangement and a measuring position of the ram and is triggered by the movement of the ram with a switching element arranged thereon. During a vertical movement, in particular a downward movement of the ram, the switching element can thus be guided past the sensor, and the sensor can output a signal, whereby a switchover to the creep mode is implemented and is maintained until setdown of the measuring probe on the item to be measured. By way of example, the sensor can be formed as a photocell, light barrier, forked light barrier or proximity switch or the like.

Furthermore, following the setdown of the measuring probe in the measuring position on the item to be measured, the freewheel is preferably activated and the drive arrangement preferably continues to move in the creep mode until it actuates a lower end switch. The damping region is consequently determined by the position of the sensor on or in the housing between the starting position and the measuring position and also the lower end switch. As soon as the lower end switch is actuated, the control arrangement receives the signal that the movement is completed and waits until a measurement signal is forwarded to the control arrangement by means of the measuring probe, whereby the start signal to lift the ram and to return the measuring probe from the measuring position into the starting position is given for the control arrangement. The arrival of the measuring probe in this starting position is detected in turn by an upper end switch in the starting position, and the movement is stopped.

Furthermore, the size of the damping region (i.e. a vertical movement of the ram with reduced movement speed) can be determined by a position of the switching element that is adjustable along the ram. The damping region can thus also be set manually to a predetermined distance of travel covered by the ram, that is to say an adaptation or reduction of the damping region and thus a reduction of the time in order to pass through the damping region can also be set. Alternatively, a predetermined period of time, which in particular may be dependent on a pre-selectable reduced movement speed, for the reduced movement speed of the ram, can also serve as a measure for the setting of the damping region.

The damping region preferably comprises at least one movement distance, which starts above the measuring position of the measuring probe and extends at least slightly beyond the activation of the freewheel.

Furthermore, the damping region may have at least one movement distance that is greater than a movement of immersion of a sensor element of the measuring probe with respect to a sleeve of the measuring probe in which the sensor element is guided in an immersible manner. With a simple adjustment of the distance of travel of the ram relative to the measurement surface of the item, it is thus ensured that a measuring probe, prior to the setdown of the sensor element of the measuring probe or the setdown of the measuring probe on the item to be measured, is moved at a reduced movement speed, since the measuring probe is already located in the damping region and the mechanical or electrical damping acts in order to thus achieve a gentle setdown on the surface of the item to be measured.

A mechanical damping of the movement speed is preferably activated by a damping arrangement having an adjustment member which has a damping member, with which the immersion speed remains constant or reduces with increasing immersion distance. Alternatively to an electronic activation of the damping, a mechanical damping can thus be provided.

The object forming the basis of the invention is further achieved by a measurement stand with which a movement speed of the drive controller can be adjusted and is reduced by electrical damping or mechanical damping before the measuring position is reached. A movement of the drive arrangement, said movement being transferred to the vertical movement or the movement speed of the ram, can thus be braked before the measuring probe comes to rest on the measurement surface of the item to be measured.

The electrical damping can preferably be activated by the control arrangement which activates the control voltage or the rotational speed of the motor. A sudden change to the movement speed of the control arrangement and therefore of the ram, which is caused by the force of gravity on the control arrangement, can thus be implemented. The change to the voltage and/or the rotational speed is preferably adjustable at the control arrangement, such that an adaptation to different probe types and/or sensitive measurement surfaces is also made possible.

In order to initiate the electrical damping, a sensor is provided between the starting position and the measuring position of the probe or of the ram, by means of which sensor a control signal is output to the control arrangement in order to activate the damping as soon as a switching element arranged on the ram has run past the sensor. An exact and repeatable activation for initiation of the damping can thus be enabled, and a start of the damping region can thus be determined. Here, the sensor is preferably a light barrier, and the sensor element is formed for example as a lug or the like in order to trigger a signal at the light barrier.

The switching element can be adjustable in height along the ram and/or the sensor is preferably movable along the path of travel, whereby the size of the damping region can be adjusted. This damping region is preferably set once and is then only adjusted again by a height adjustment of the housing relative to the measuring table or relative to the measurement surface of the item to be measured, in order to then perform the measurements.

With the use of electrical damping to set down the measuring probe at a reduced movement speed on the surface of the item to be measured, a drive arrangement is preferably provided, which has a movable carriage along a vertically oriented guide, which carriage is activated so as to be movable up and down by the motor, wherein the motor is connected in terms of drive to the carriage. Here, a belt drive can be provided by way of example in order to move the carriage up and down. Since, with the downward movement of the drive arrangement or the carriage, the gravitational forces of the carriage and of the ram promote a high movement speed, a toothed belt may be sufficient as an operative connection between the motor and the carriage.

Furthermore, in the case of a measurement stand with electrical damping, an upper end switch is preferably provided in a starting position of the drive arrangement and a further lower end switch is preferably provided in a lower end position of the drive position, which lower end switch is arranged below the measuring position of the measuring probe. Following the activation of the freewheel, which occurs at the moment of setdown of the measuring probe on the measurement surface of the measuring position, a further movement of the drive arrangement can thus be monitored and then stopped, without however impairing the setdown of the measuring probe on the measurement surface. The end of the damping region can thus also be determined and defined.

Furthermore, a mechanical damping arrangement, which is arranged in the housing and counteracts a movement of the drive arrangement and thus the vertical movement of the ram in the direction of the item to be measured, preferably cooperates with the drive arrangement to form the measurement stand with mechanical damping. The movement energy of the drive arrangement and of the ram during the transfer into the measuring position can thus in turn be considerably reduced, wherein what is known as a kinked characteristic line is preferably achieved. The characteristic line illustrates a change of a high movement speed, which is preferably constant, to a low or reduced movement speed, which is likewise constant. Here, a bend interconnecting the two straight lines illustrating the respective constant movement speed is produced during the switchover.

In the case of the mechanical damping arrangement, a speed of immersion of the adjustment member into the damping member preferably remains constant or even decreases with increasing immersion distance. Gentle setdown conditions for the measuring probe on the surface of the item to be measured can thus be achieved.

In accordance with a first embodiment, the mechanical damping member may have a reciprocating piston cylinder. A structurally simple component is thus provided, which enables long-term use.

The damping medium in the mechanical damping member preferably comprises a liquid or a gas, in particular oil, air, gel or water.

The mechanical damping arrangement may alternatively comprise an electromagnetic damping member or eddy current damping, by means of which the immersion movement of the adjustment member is determined.

Furthermore, a drive arrangement with which the carriage is guided movably up and down along a vertical guide is preferably provided, wherein a motor is present, which has a driving torque in order to counteract the mechanical damping arrangement.

The mechanical damping arrangement is preferably provided physically separated or decoupled from the drive arrangement, in particular fastened on the housing. The drive arrangement is thus initially driven at a high movement speed, wherein the damping region is also determined by the mechanical damping arrangement, in particular the immersion distance of the adjustment member. As soon as the drive arrangement, in particular with the carriage, comes to rest on the adjustment member of the damping arrangement, the mechanical damping is implemented, i.e. a reduction of the movement speed for the setdown of the measuring probe in the measuring position on the item to be measured.

The adjustment member of the mechanical damping arrangement advantageously counteracts a movement of the drive arrangement or a driving torque of the motor.

Furthermore, a pivot lever mechanism, a cam-follower mechanism, a steep-threaded spindle or a disc cam is preferably provided between the motor and the carriage of the drive arrangement. Driving torques directed directly against the mechanical damping arrangement can thus be transferred.

Furthermore, a rotary magnet motor is preferably provided. This can be controlled in terms of the angle of rotation thereof and driving torque to be applied thereby. In addition, such rotary magnet motors have the advantage that they can transmit high accelerations and high forces. An independent return of the motor and preferably of the drive arrangement into a starting position is preferably possible by means of a return spring arranged therein.

The invention and further advantageous embodiments and developments thereof will be described and explained in greater detail hereinafter on the basis of the examples illustrated in the drawings. The features to be inferred from the description and the drawings can be applied individually or together in any combination in accordance with the invention. In the drawings:

Figure 1:
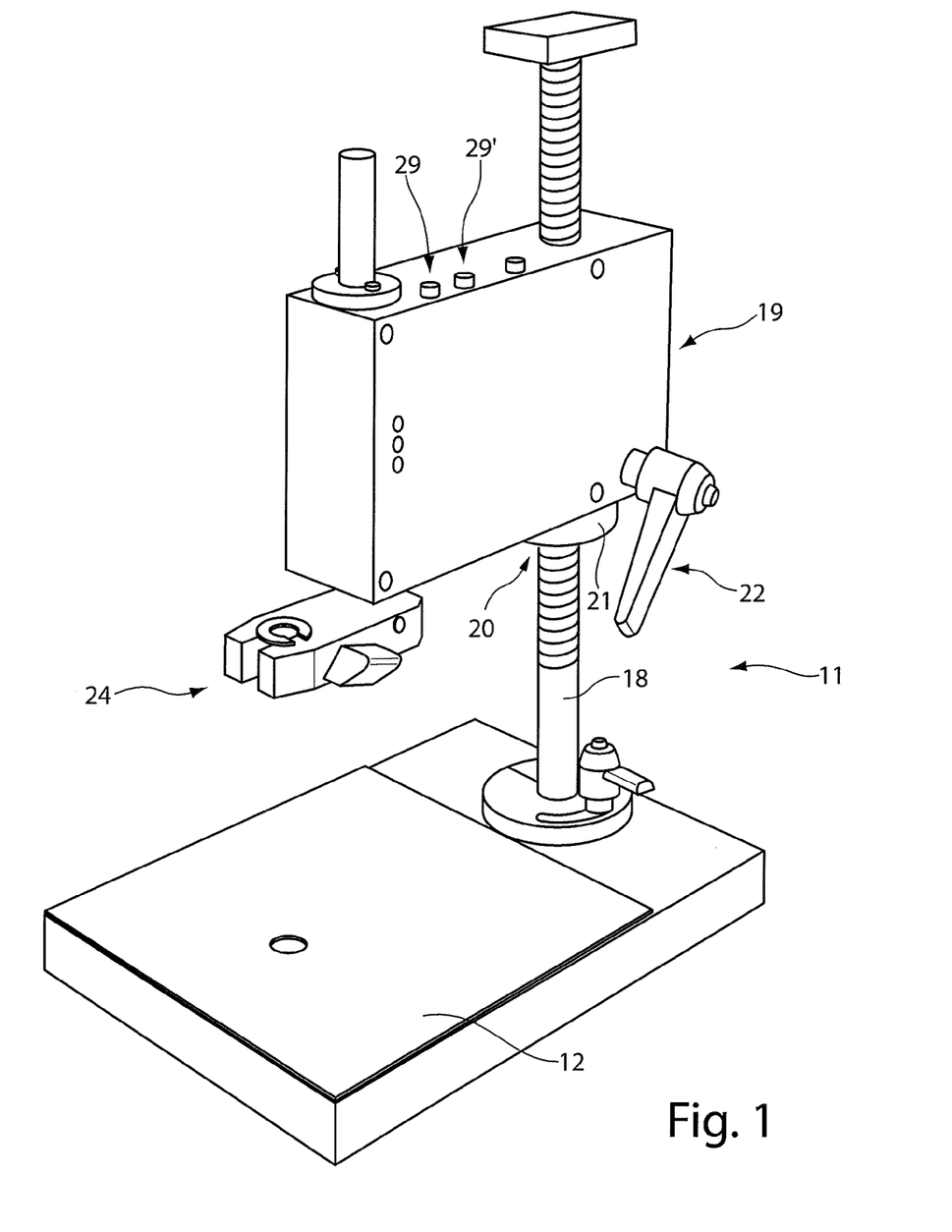
FIG. 1 shows a perspective illustration of a measurement stand according to the invention.
Figure 2:
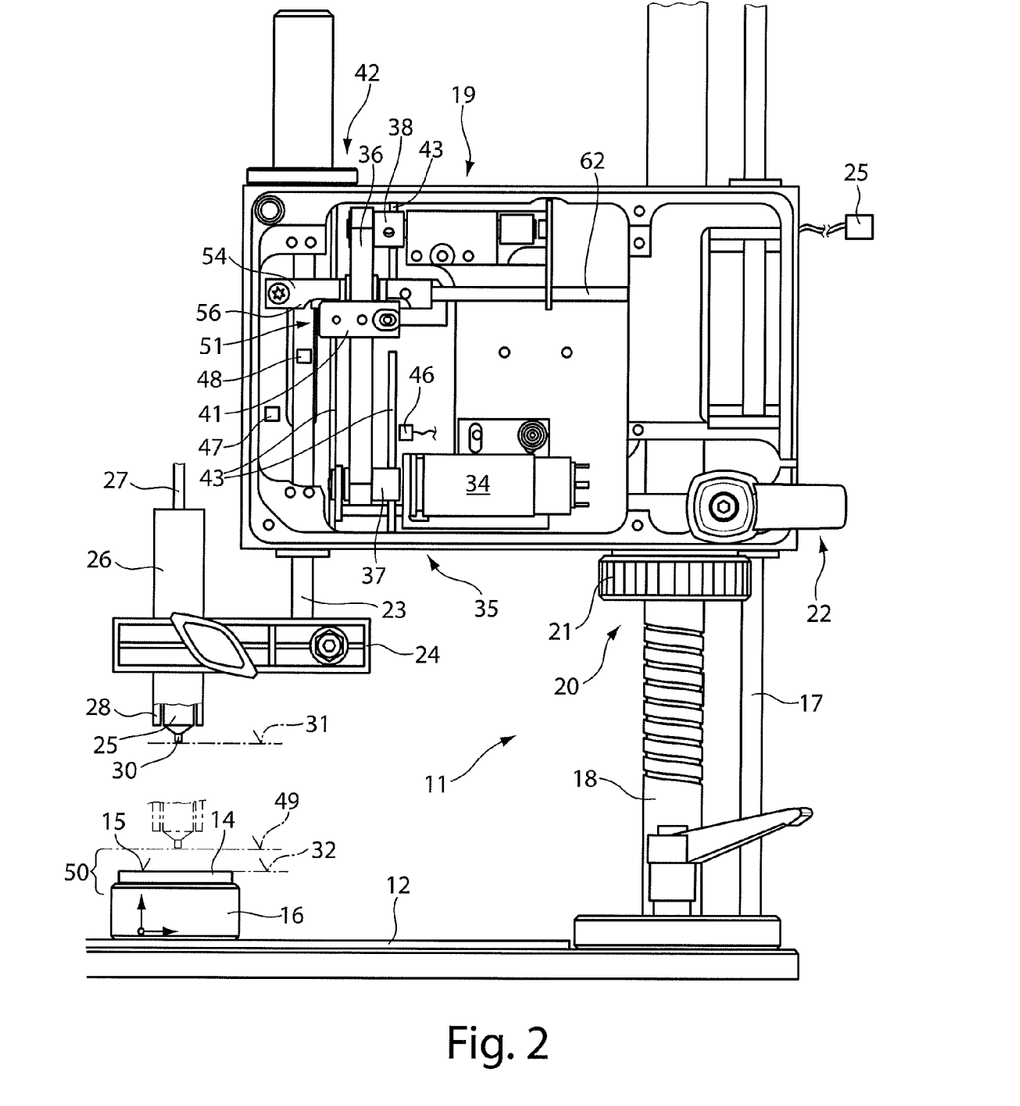
FIG. 2 shows a schematic side view of a housing of the measurement stand according to FIG. 1 with a measuring probe in a starting position.

In FIG. 1, a measurement stand 11 according to the invention is illustrated perspectively, and in FIG. 2 a side view is illustrated. This measurement stand 11 comprises a measuring table 12, on which individual objects to be measured or items to be measured 14 can be placed directly or can be held by a mount 16. At the foot of the measurement stand 11 or on the measuring table 12, a vertically arranged column 17 is provided, which, with a threaded column 18, supports a housing 19 in a height-adjustable manner. Due to the two columns 17, 18 arranged adjacently to one another, a parallel guidance for simple height adjustment can be provided. The housing 19 can be oriented by means of an adjustment mechanism 20, which comprises at least one adjustment screw. The height can be set via an adjustment screw 21. In addition, a clamping mechanism 22 is provided in order to fix the housing 19 at a height relative to the measuring table 12.

Opposite the columns 17, 18, a ram 23 is supported on the housing 19 in a manner movable up and down. At the lower end of the ram 23, a retainer 24 for detachably fixing measuring probes 26 or sensors or the like is provided. The retainer 24 can alternatively also be designed to support a number of measuring probes 26 or sensors. By way of example, the measuring probe 26 is intended for the measurement of the thickness of thin layers. For example, this measuring probe 26 has a sensor element 25 with a setdown cap 30, which can be set down on a measurement surface 15 of the item to be measured 14. The sensor element 25 is guided displaceably in a sleeve 28 of the measuring probe 26 and can be immersed therein, such that the sensor element 25 is positioned completely within the sleeve 28. At the opposite end of the measuring probe 26, a connection line 27 is provided, which is connected to a separate measuring device (not illustrated in greater detail) or can be connected at a connection point (not illustrated in greater detail) of the measurement stand 11 to a control arrangement 25 at an end face of the housing 19.

For example, two operating elements 29, 29', in particular buttons, are provided on an upper side of the housing 19. When the button 29 is actuated, a one-time movement from the starting position 31 into the measuring position 32 and back again into the starting position 31 is performed. When the button 29' is actuated, the previously described one-time routine can be provided a number of times in succession, wherein the number of repetitions is preferably freely programmable.

In FIG. 2, the measuring probe 26 is arranged in a starting position 31. By means of the ram 23, the measuring probe 26 can be lowered and transferred into a measuring position 32, which in this exemplary embodiment corresponds to a setdown position on the measurement surface 15 of the item to be measured 14. The distance or path of movement between the starting position 31 and the measuring position 32 is smaller than a working range or path of travel of the ram 23. The housing 19 is preferably positioned beforehand via the adjustment screw 21 in such a way relative to the measurement surface of the item to measured 14 that the starting position 31 and the measuring position 32 are located within the working range of the ram 23.

In order to activate a movement, an electric motor 34 is provided in the housing 19, which motor drives a drive arrangement 35 which is connected to the ram 23. The drive arrangement 35 comprises a drive element 36, which in particular is formed a toothed belt. This drive element 36 is supported by an upper and lower idler pulley 37, 38. These idler pulleys 37, 38 are preferably formed as toothed cylinders and are matched to the contour of the teeth of the toothed belt. A slip-free transmission of the drive movement is made possible by the selection of the toothed belt and the toothed cylinder. The lower idler pulley 37 is fastened directly to the driveshaft of the motor 34.

Figure 3:
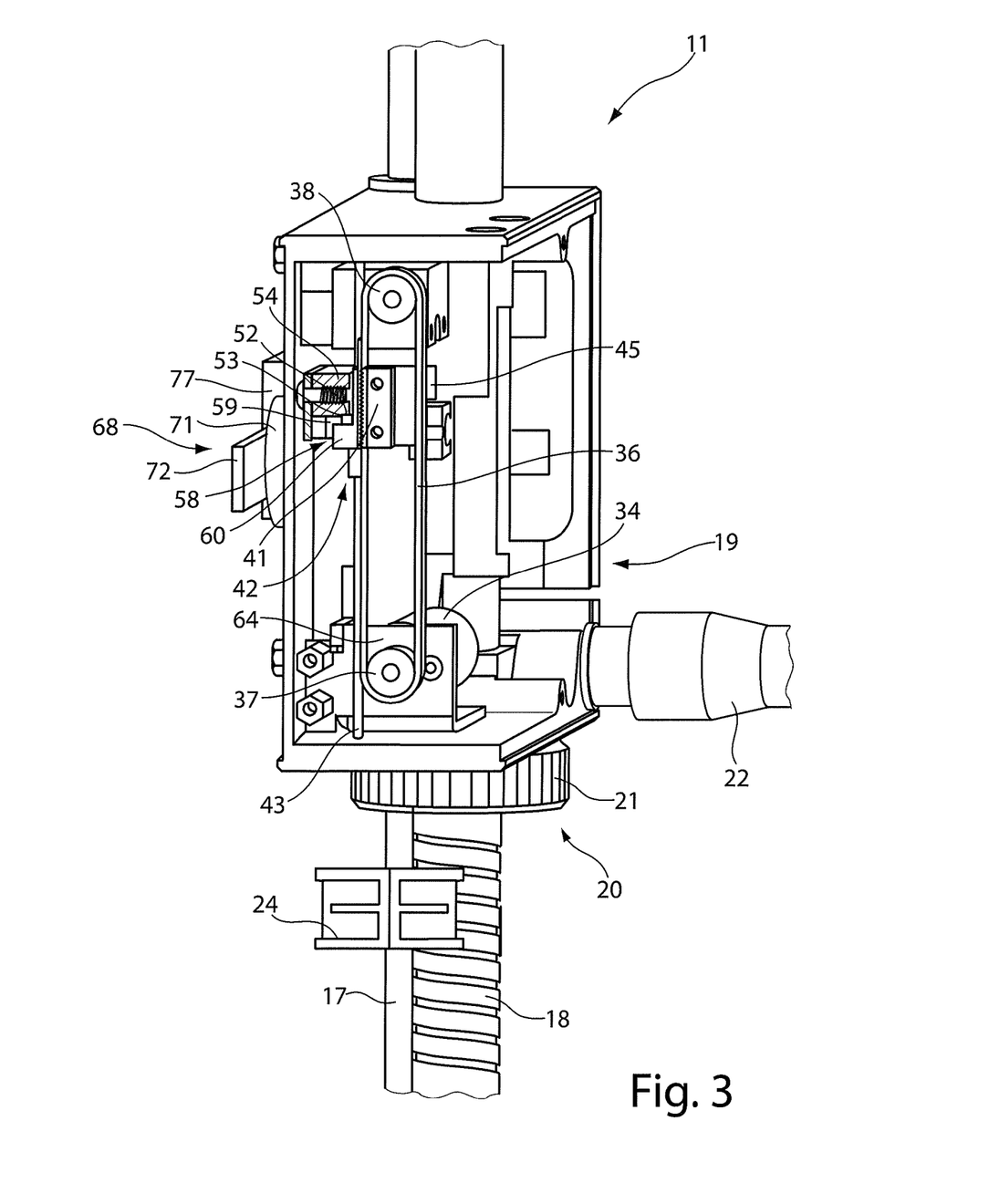
FIG. 3 shows a perspective view from a front face of the housing of the measurement stand according to FIG. 1.

A coupling element 41, which is illustrated in FIG. 3, is provided on the drive element 36. The coupling element 41 is guided along a guide 42, which preferably comprises two guide elements 43, in particular guide rods, oriented parallel to one another. The coupling element 41 is connected by a clamping fastener to the drive element 36. As viewed in plan view, the coupling element 41 has a U-shaped contour, such that the drive element 36 is guided within the two limbs of the U-shaped contour and the respective limbs act on the guide elements 43.

A switching lug 45 is preferably provided on the coupling element 41 and cooperates with a sensor element or a forked light barrier, which is arranged on a printed circuit board (not illustrated in greater detail), which is also part of the control and regulation arrangement. An upper end position of the drive arrangement 35 can thus be detected. Alternatively, an upper end switch 44 can also be provided. The control arrangement 25 can be arranged in the housing 19 or, as illustrated, can also be positioned outside the housing.

Figure 4:
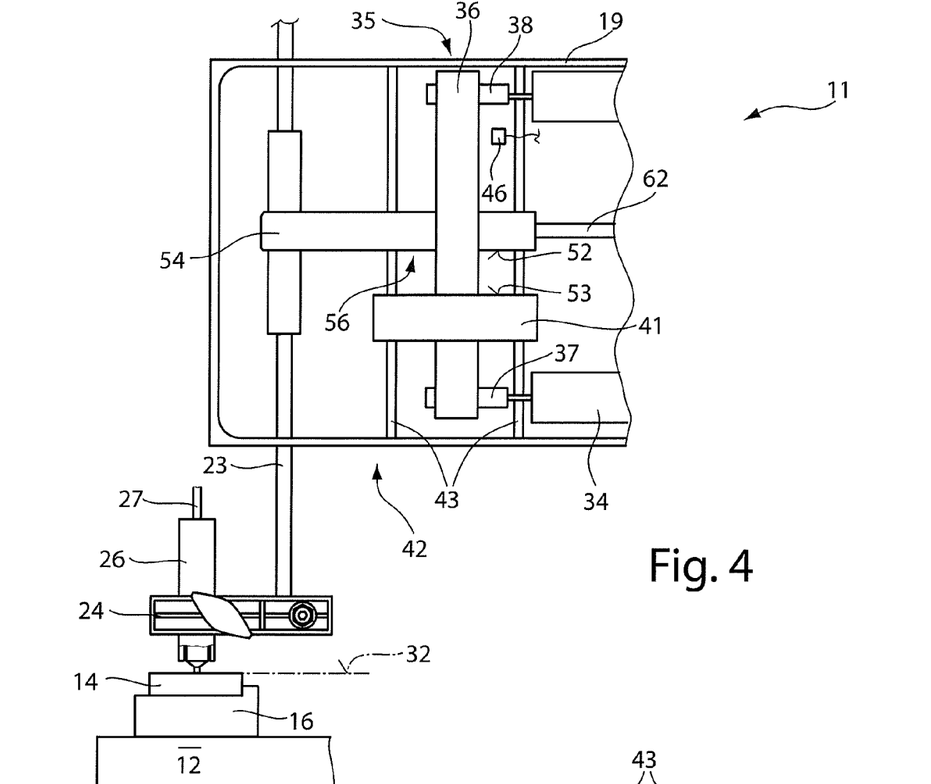
FIG. 4 shows a schematic side view of the housing of the measurement stand with a measuring probe in a measuring position.

The ram 23 and the drive arrangement 35 are coupled to one another by a freewheel 51 (FIG. 3). This freewheel 51 is formed on the one hand by a supporting face 52 arranged on the coupling element 41 and on the other hand by a bearing face 53. Due to the inherent weight of the ram 23, the bearing face 53 rests on the supporting face 52. This bearing face 53 is preferably provided on a carriage 54, which is preferably guided movably up and down on the guide 42. The carriage 54 has a receiving portion 56, via which the ram 23 is detachably coupled to the carriage 54. Due to the fact that the ram 23 rests on the drive arrangement 35 during a movement of the measuring probe 26 driven by the motor 34, a continued running of the motor 34 and thus a further lowering of the coupling element 41 is made possible immediately following the setdown of the measuring probe 26 on a measurement surface of the item to be measured 14, without the driving force being transmitted to the ram 23 and thus to the measuring probe 26. This decoupled position of the freewheel 51 is illustrated in FIG. 4. By means of a lower end switch 46 in the housing 19, a lower end position of the drive arrangement 35 is detected and the motor 34 is stopped.

Figure 5:
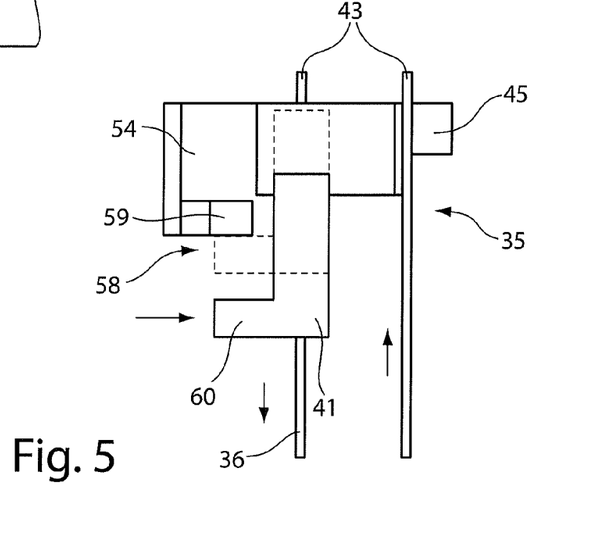
FIG. 5 shows a schematic detailed view of a switching device of the measurement stand according to FIG. 1.

The freewheel 51 preferably comprises a switching device 58, which is activated as soon as the bearing face 53 is lifted from the supporting face 52. To this end, the switching device 58 has a first component 59, which is arranged on the carriage 54 or ram 23, and a second component 60, which is connected to the coupling element 41 or the drive arrangement 35. The first component 59 is preferably formed as a forked light barrier, and the second component 60 is preferably formed as a switching finger or switching lug 45. As soon as the freewheel 51 is activated, the second component 60 is guided out of the first component 59, and a switching signal is output to the control and regulation arrangement. This position is illustrated by dashed lines in FIG. 5. A printed circuit board is preferably arranged on the carriage 54 and processes the switching signal of the forked light barrier, which is fastened to the printed circuit board, and forwards this to the control and regulation arrangement. The control lines necessary for this purpose are preferably fastened on a guide rod 62, which can be moved up and down in a guide close to the threaded column 18. The guide rod 62 is fixedly connected at one end to the carriage 54. Opposite, the guide rod has a rolling bearing or plain bearing, which is movable up and down in the guide. Due to this guide rod 62, a possible radial driving force acting on the ram 23 is eliminated.

A bearing 64 for mounting the driveshaft of the motor 34 can be used simultaneously as a stop for a downward movement of the drive arrangement 35.

Between an upper and lower end position of the drive arrangement 35, a sensor 47 is provided, which is preferably fastened to the housing 19. A switching element 48 matching the sensor 47 is provided and is preferably fastened to the ram 23. Alternatively, this switching element can also be fastened to the carriage 54. The sensor 47 is passed during a vertical movement of the ram 23 from the starting position 31 into the measuring position 32. By way of example, the sensor 47 can be set in such a way that it is in the position 49 when a switching signal is issued. The illustration of the position 49 is merely exemplary and can be closer to or further away from the measurement surface 15 of the item to be measured 14 or can be positioned toward the lower end switch in the housing 19. This sensor 47 and the switching element 48 may preferably be a light barrier with a switching lug. Alternatively, the switching lug 45, which is fastened to the coupling element 41, may also be assigned a further light barrier, for example in order to detect a position 49.

Between the position 49 and at least the measuring position 32 or a position arranged therebelow, which may extend until the drive arrangement occupies a lower end position, a damping region 50 is formed, within which the movement speed of the measuring probe 26 is mechanically or electrically damped. Above this damping region 50 (i.e. from the starting position 31 to the position 49), a high movement speed or a movement speed of the measuring probe 26 in the rapid mode is present and is driven by the motor 34. Once the position 49 has been passed, the damping occurs, that is to say a reduction of the movement speed of the measuring probe 26 in order to achieve a slow movement of the measuring probe 26 towards the measurement surface 15 of the item to be measured 14. The size of the damping region 50 can be set by the height of the sensor 47 and of the switching element 48 or of the switching lug 45 and a further light barrier assigned thereto.

Figure 6:
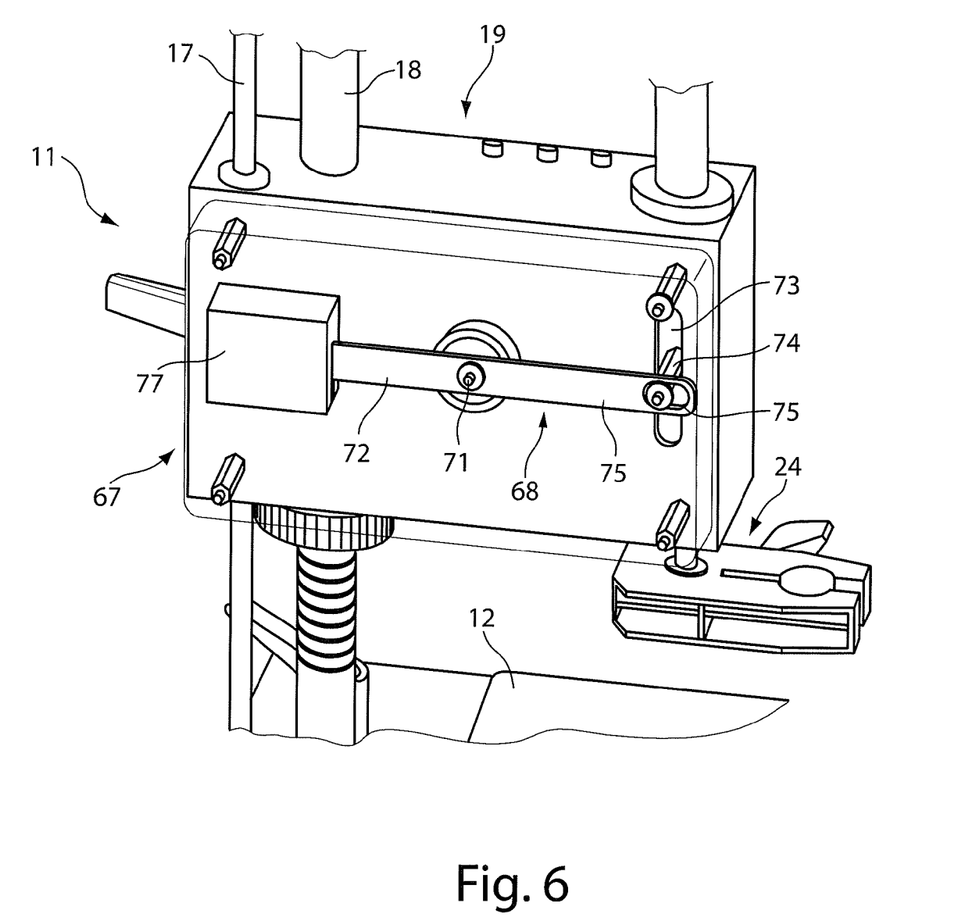
FIG. 6 shows a perspective view of a rear wall of the housing of the measurement stand according to FIG. 1 with a weight relief arrangement arranged thereon.

In FIG. 6, a weight relief arrangement 68 is provided on a rear side 67 of the housing 19. This weight relief arrangement 68 can then be attached when the retainer 24 receives a plurality of measuring probes 26 or sensors or larger and heavier measuring probes 26 or the like. This weight relief arrangement 68 causes the at least one measuring probe 26 to sit on the measurement surface with only a low inherent weight. The weight relief arrangement 68 is fastened to the rear wall 67 via a bearing pin 71 and receives a lever arm 72 pivotably. At one end of the lever arm 72, a fastening pin 74 is provided, which acts on the ram 23 and passes through a through-bore 73 in the rear face 67. The fastening pin 74 is fastened in a slot recess 75 of the lever arm 72, such that a compensating movement is made possible during the pivot motion of the lever arm 72. Opposite, at least one mass element 77 is provided on the lever arm 72. This mass element can be displaceable along the lever arm 72 by the retainer 24 in accordance with the load to be absorbed. In addition, the mass element 77 can be provided exchangeably on the lever arm 72, such that larger or smaller mass elements 77 can be attached thereto. This weight relief arrangement 68 is preferably covered and protected by a cover.

Such a measurement stand 11 is preferably used for layer thickness measurement. The layer thickness measurement can be performed by a magneto-inductive method or an eddy current method. The use of the respective method is dependent on the base material and the layers to be measured. By way of example, the magneto-inductive method is used in the case of non-magnetic layers on ferromagnetic base materials. The eddy current method is performed in the case of electrically non-conductive layers on non-iron metals.

Alternatively, the measurement stand 11 can also be used for further measurement tasks. The retainer 24 is arranged detachably on the ram 23, such that retainers 24 that are matched to the measurement elements can be arranged on the ram 23 in accordance therewith.

Such measurement stands 11 are used in particular when measuring the thickness of thin layers on an item to be measured 14 and when taking serial measurements on an item to be measured 14, since, in the case of a manual measurement with a measuring probe 26, the measuring probe 26 is set down on the measurement surface at different speeds or forces and the surface of the item to be measured 14 is damaged and the measured values are falsified as a result.

In order to set up such a measurement stand with electrical damping for a new measurement task, the following approach can be adopted:

The item to be measured 14 is placed on the measuring table with or without mount 16. The drive arrangement 35 is then positioned in a lower end position, and the measuring probe 26 is placed on the measurement surface 15 of the item to be measured 14. The housing 19 is then moved slightly upwards by the adjustment mechanism 20, such that, for example, a measuring probe 26, which comprises a sleeve in which the sensor element is immersibly arranged, is lifted slightly from the measurement surface 15, wherein the sensor element itself continues to rest on the measurement surface 15. A first measurement cycle can then be performed. Here, an independent routine is performed, which may be a one-time routine or comprises a number of repetitions. The start is to be initiated merely by means of one of the buttons 29.

At the start of the routine, the drive arrangement 35 is arranged in a starting position 31. The drive arrangement 35 is then lowered at a high movement speed or in the rapid mode, until a signal is output to the control arrangement 25 via the sensor 47 when passed by the switching element 48, whereby electrical damping for the movement speed is initiated. A voltage change or a reduction in the drive rotational speed is implemented, such that the measuring probe 26 is lowered further within the damping region 50 at a considerably reduced movement speed. Following the setdown of the measuring probe 26 on the measurement surface 15, the freewheel 51 is activated, such that the motor 34 can continue to actuate the drive arrangement 35 with no driving force on the ram 23. The damping region ends at the latest as soon as the drive arrangement 35 has adopted the lower end position. Alternatively, by means of the activation of the freewheel 51, a signal can be output, whereby the damping region 50 is ended, that is to say the activation of the motor is stopped and the motor 34 is brought to a stop. Once the lower end position has been reached or once the motor 34 has been stopped, the measuring probe 26 remains for a predeterminable residence period on the item to be measured 14 in order to carry out the measurement. By means of the control arrangement 25, the measuring probe 26 is then returned to the starting position 31. This return movement from the measuring position 32 into the starting position 31 can also then be started by the control arrangement 25 as soon as this receives a control signal from the measuring probe 26, said control signal indicating that a measured value has been obtained.

Figure 7:
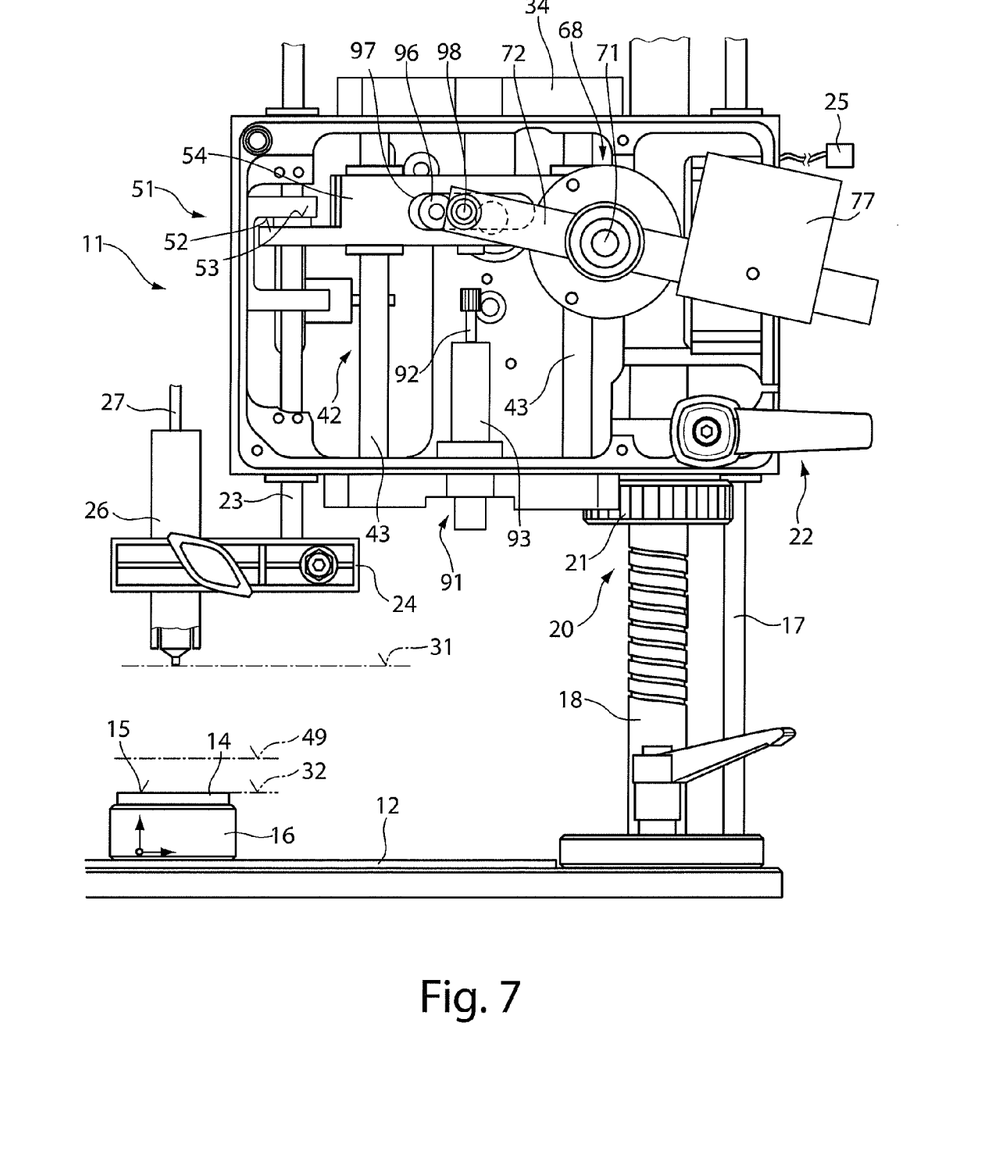
FIG. 7 shows a schematic side view of an alternative embodiment of the measurement stand according to FIG. 2.

In FIG. 7, an alternative embodiment of the measurement stand 11 compared with the embodiment according to FIG. 2 is illustrated. This embodiment deviates in terms of the specific design of the drive arrangement 35 and also in terms of the damping of the movement of the ram 23 by a mechanical damping arrangement 91. For the rest, reference can be made to the structure, the operating principle and the variants of the measurement stand 11 described in FIGS. 1 to 6.

Figure 8:
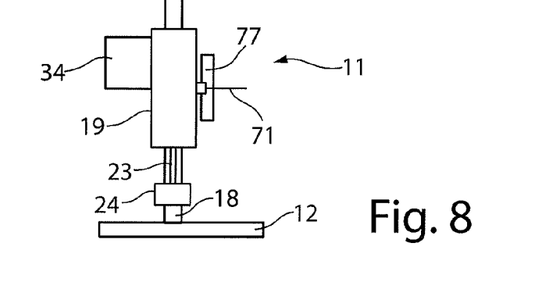
FIG. 8 shows a schematic front view of the measurement stand according to FIG. 7.

The deviations will be explained in detail hereinafter:

In accordance with FIGS. 7 and 8, the drive arrangement 35 comprises a motor 34 that is fixed laterally to the housing 19 on an outer wall. A pivot lever 95 is driven via a drive shaft of the motor 34 and engages with the carriage 54 of the drive arrangement 35. A roller 96 is preferably provided at the free end of the pivot lever and is guided preferably with only slight play in a recess 97, in particular a slot recess 97. Due to a pivot motion of the pivot lever 95, the roller 96 is transferred from a twelve o'clock position, for example in an anti-clockwise direction, into a six o'clock position, whereby a downward movement of the carriage 54 along the guide 42 is performed. In addition, a lever arm 72 is mounted rotatably about a pivot axis 71 on an outer side of the housing 19 opposite the motor 34, wherein one half of the lever arm 72 receives a balancing weight 77, which is movable and fixable along the right lever arm in order to set an appropriate lever force. A further roller 98 is provided opposite on the lever arm 72 and also engages with the recess 97 of the carriage 54. This weight relief arrangement 68 corresponds in terms of the function to that described in FIG. 6.

A mechanical damping arrangement 91 is arranged in the housing 19, advantageously at the base of the housing 19. This mechanical damping arrangement for example comprises an adjustment member 92, which is guided immersibly in a damping member 93. By way of example, the damping member 93 is formed as a reciprocating piston cylinder. The mechanical damping member 91 preferably works with a fluid, in particular oil, gas, air, gel or water. The damping rate can be easily adjusted.

The damping arrangement 91 preferably engages with the adjustment member 92 between the two guides 42 centrally on the carriage 54 and counteracts a downward movement of the carriage 54 in a damping manner.

Figure 9:
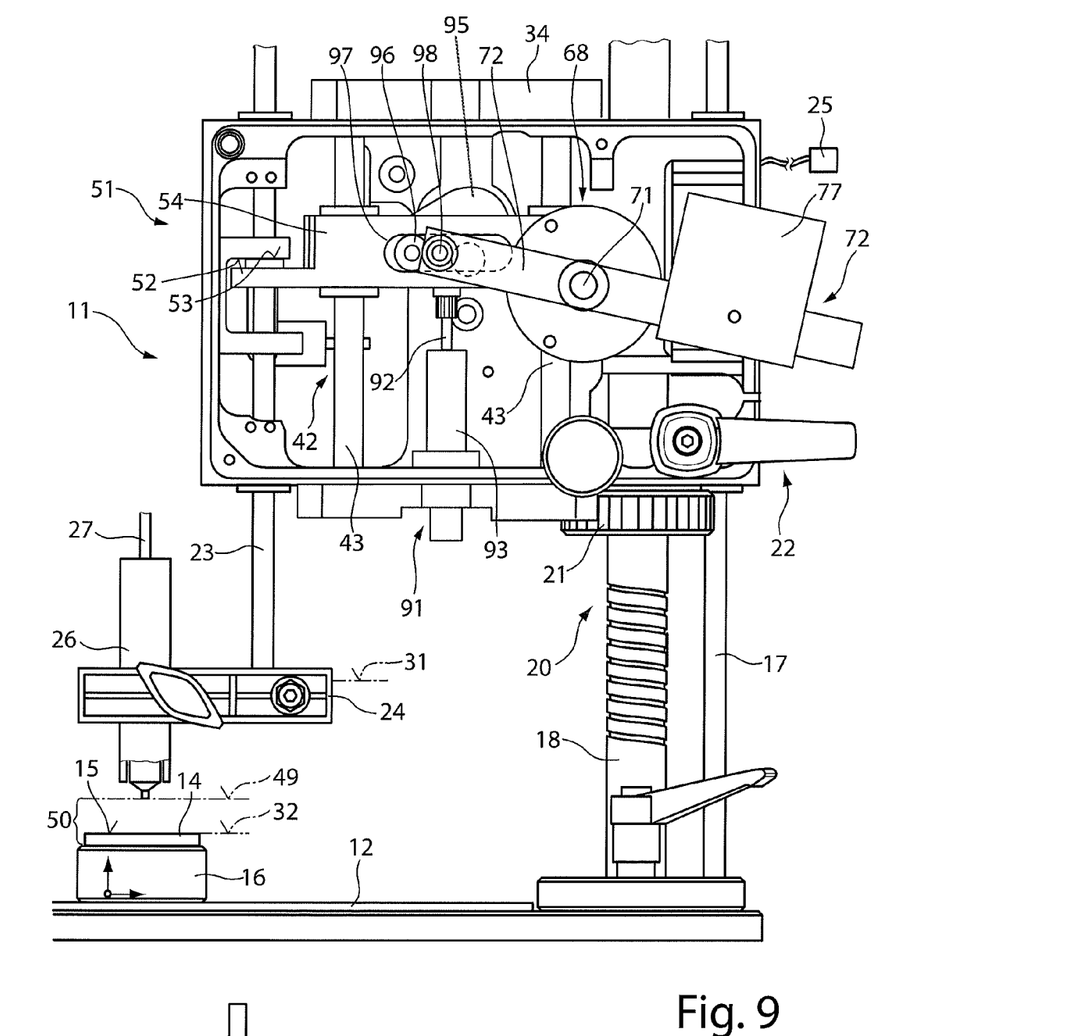
FIG. 9 shows a schematic side view of the measurement stand according to FIG. 7 in a first movement position.

Such a measurement stand 11 with a mechanical damping arrangement 91 operates as follows:

An item to be measured 14 is positioned with or without mount 16 on a measuring table 12. The drive arrangement 35 is in a starting position 31 illustrated in FIG. 7. The motor 34 is then energised via the control arrangement 25. This motor 34 is preferably a rotary magnet motor, which can generate a high initial torque. The pivot lever 95 is then driven in rotation, such that it rotates in an anti-clockwise direction and moves the carriage 54 downwardly along the guide 42. Since the downward movement is assisted by the weight of the ram 23 and of the measuring probe 26, and the counterweight 77 counteracts only slightly on account of the lever arm 72, the downward movement of the drive arrangement 35 is performed at a high movement speed, that is to say in a rapid mode. The carriage 54 then abuts against the adjustment member 92 of mechanical damping arrangement 91. This is illustrated in FIG. 9. The measuring probe 26 at this moment in time has covered a large path at high speed in the direction of the measurement surface 15 of the item to be measured 14. The damping region 50 now starts, since the carriage 54 of the drive arrangement 35 rests on the adjustment member 92 of the mechanical damping arrangement 91. The pivot lever 95 preferably has a pivot range of more than 90°, preferably greater than 100°, wherein the pivot lever 95 is oriented in such a way that a high movement speed on the carriage 54 is produced at the start and this decreases toward the end of the movement, wherein the lifting force then increases. Thus, a starting position or initial position of the pivot lever is between an eight o'clock to ten o'clock position or between a two o'clock to four o'clock position or is even an eleven o'clock to one o'clock position in a range between a seven o'clock or six o'clock position or five o'clock or six o'clock position respectively. At the end of the pivot phase, the damping arrangement 91 can be countered with a high leverage force via the pivot lever 95. Starting from the position illustrated in FIG. 9, the vertical movement of the ram 23 and thus of the measuring probe 12 is transferred into a creep movement, such that a slow movement of the measuring probe 26 toward the measurement surface of the item to be measured 14 is provided. An immersion speed of the adjustment member 92 of the mechanical damping arrangement 91 is determined by the damping member 93.

Figure 10:
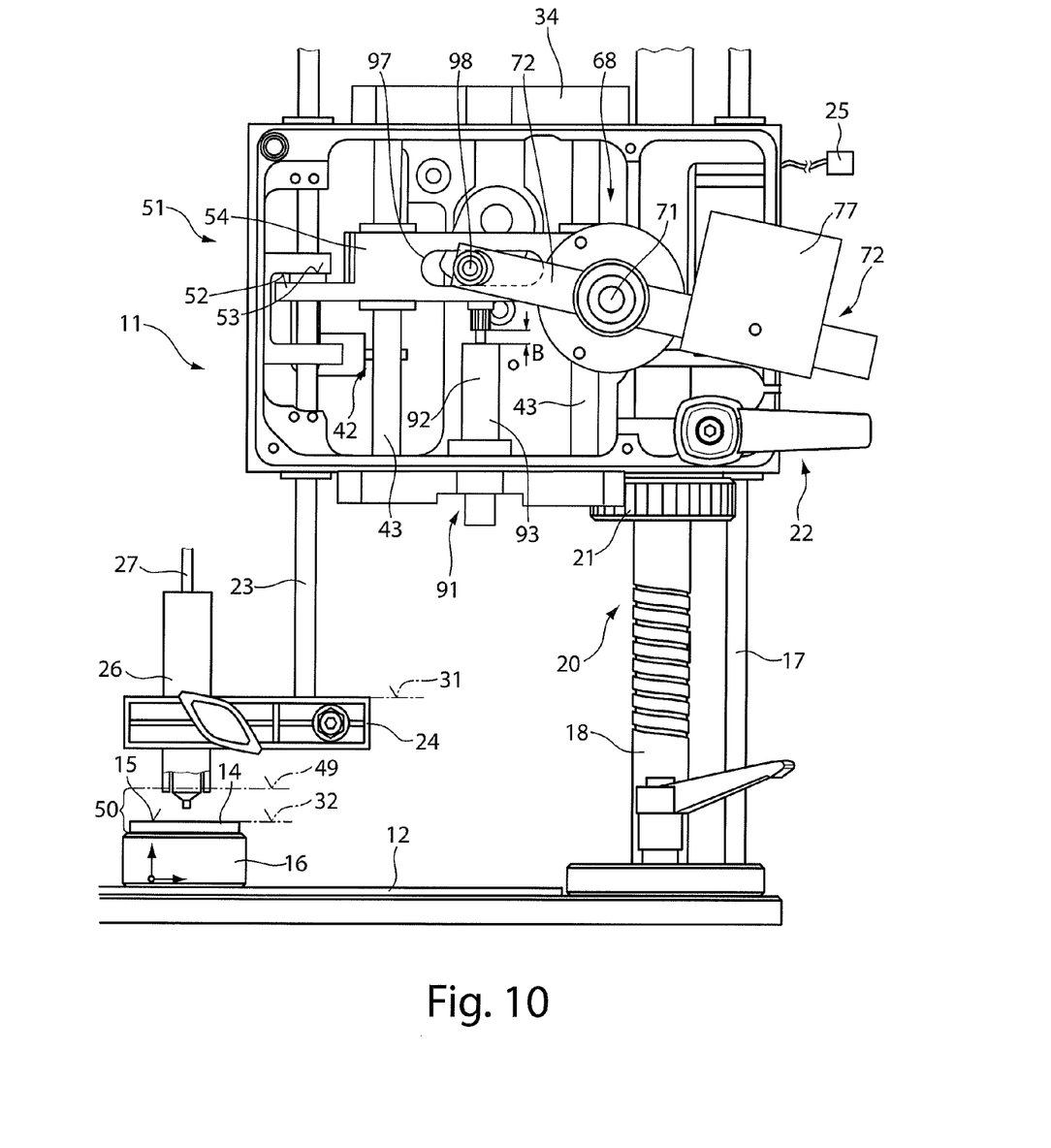
FIG. 10 shows a schematic side view of the measurement stand according to FIG. 7 in a further movement position.

A transfer position within the damping region 50 shortly before the setdown of the measuring probe 12 on the item to be measured 16 is illustrated in FIG. 10.

Figure 11:
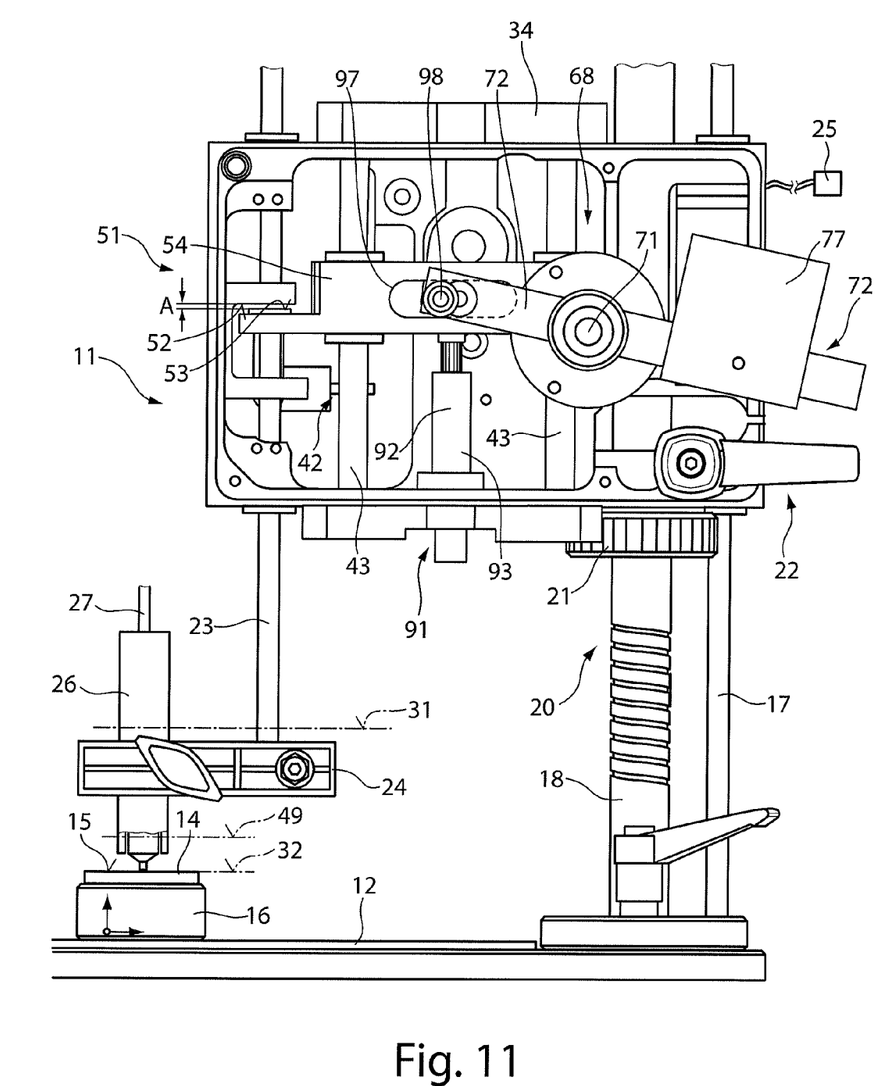
FIG. 11 shows a schematic side view of the measurement stand according to FIG. 7 in a measuring position of the measuring probe.

Following the setdown of the measuring probe 12 on the measurement surface 15 of the item to be measured 14 according to FIG. 11, the driving torque of the motor 34 can continue to be effective, such that the adjustment member 92 passes through a remaining path of travel, which can be seen with comparison of FIGS. 10 and 11. At the same time, the freewheel 51 is activated, as is illustrated in FIG. 11 by the reference sign A, such that no drive forces act on the measuring probe 12 and thus on the measurement surface 15.

Once the end position illustrated in FIG. 11, which can preferably be detected by a lower end switch (not illustrated), has been reached, the motor 34 is deenergised for a predetermined period of time via the control arrangement 25 in order to hold the pivot lever 95 in this position, which is necessary at least in order to take a measurement using the measuring probe 26. A return spring contained in the motor 34 preferably causes a return movement following disconnection of the current. Additionally or exclusively, the motor 34 can also be driven for the return movement. Here, the return of the drive arrangement 35 into the starting position 31 is assisted by the balancing weight 77, in particular when there is no return element provided in the motor, in order to lift the measuring probe 12 from the item to be measured 14 following the measurement and in order to return the drive arrangement 35 into the starting position 31 according to FIG. 1.

Alternatively to the motor 34 illustrated in FIGS. 7 to 11 and alternatively to the drive arrangement 35, alternatives can also be provided in order to activate the carriage 54 in an up-and-down movement, wherein the downward movement thereof is superimposed by mechanical damping by means of the damping arrangement 91. By way of example, a motor can be driven via a drive, such as a chain, a toothed belt or the like, or a cam-follower mechanism, such as a cam disc or a steep-threaded spindle, which is adapted in terms of the curve or thread profile to the size or length of a path of movement for the rapid speed and the subsequent damping region 50.

What is claimed is:

1. A method for electrically activating a measurement stand with a movement of at least one measuring probe from a starting position into a measuring position, in order to measure the thickness of thin layers,
   in which a motor is activated by a control arrangement, which moves a ram up and down via a drive arrangement, wherein a retainer is provided on the ram, to which retainer the measuring probe can be fastened,
   in which a freewheel is activated between the drive arrangement and the ram as soon as the measuring probe or retainer is set down in the measuring position on an item to be measured, and the movement of the drive arrangement is decoupled from the vertical movement of the ram,
   wherein a movement speed of the at least one measuring probe from the starting position into the measuring position is reduced by a mechanical damping before the measuring position is reached.

2. The method according to claim 1, wherein the reduced movement speed compared with a first movement speed from the starting position is activated within an adjustable damping region.

3. The method according to claim 2, wherein the reduced movement speed is kept constant within the damping region.

4. The method according to claim 2, wherein the damping region has at least one path of movement, which is greater than an immersion movement of a sensor element of the measuring probe, which is guided immersibly relative to a sleeve.

5. The method according to claim 2, wherein the damping region is delimited by a lower end switch, which measures a movement of the drive arrangement and a signal is output to the control arrangement in the event of detection of the drive arrangement, by means of which signal the movement is stopped.

6. The method according to claim 5, wherein the drive arrangement is positioned for a predeterminable period of time in the lower position toward the lower end switch, until a measurement signal is forwarded from the measuring probe to the control arrangement.

7. The method according to claim 2, wherein the damping region comprises at least one path of movement, which starts above the measuring position of the measuring probe and extends at least slightly beyond the activation of the freewheel.

8. The method according to claim 2, wherein the damping region is determined by a sensor that is movable and adjustable along the movement path of the drive arrangement or of the ram.

9. The method according to claim 1, wherein the mechanical damping is activated by a damping arrangement having an adjustment member, which damping arrangement has a damping member, which keeps constant or reduces the immersion speed of the adjustment member with increasing distance of immersion into the damping member.

10. MA measurement stand for supporting a measuring probe, for measuring the thickness of thin layers on an item to be measured, which measurement stand is intended to carry out the method according to claim 1, comprising a measuring table and a housing, which is arranged above the measuring table and in which a drive arrangement is provided, which activates a vertical movement of a ram from a starting position into a measuring position and is driven by a motor by means of a control arrangement, comprising a retainer, which is arranged on the ram and in which the measuring probe can be fastened, comprising a freewheel, which is provided between the drive arrangement and the ram, by means of which freewheel the movement of the drive arrangement is decoupled from the vertical movement of the ram in the event of setdown of the measuring probe or the retainer in a measuring position on the item to be measured, wherein a movement speed of the drive arrangement is reduced by mechanical damping before the measuring position of the measuring probe is reached.

11. The measurement stand according to claim 10, wherein an upper end switch is provided in a starting position of the drive arrangement and a lower end switch is provided in a lower end position and is arranged below the measuring position of the measuring probe.

12. The measurement stand according to claim 10, wherein the mechanical damping is activated by mechanical damping arrangement, which is arranged on or in the housing and counteracts a vertical movement of the ram, in the direction of the item to be measured.

13. The measurement stand according to claim 12, wherein the mechanical damping arrangement is formed as a reciprocating piston cylinder.

14. The measurement stand according to claim 12, wherein the damping arrangement comprises an adjustment member, the immersion speed of which into a damping member remains constant or decreases with increasing immersion distance.

15. The measurement stand according to claim 14, wherein the mechanical damping member has a liquid or gas as damping medium, wherein the mechanical damping arrangement has an electromagnetic damping member and is formed as eddy current damping.

16. The measurement stand according to claim 14, wherein the adjustment member of the damping arrangement acts directly on the carriage within the damping region of a movement of the drive arrangement and counteracts a movement driven by the motor.

17. The measurement stand according to claim 10, wherein the drive arrangement has a carriage, which is guided movably up and down along a guide, which is provided in a manner connected in terms of drive to a motor and physically separated or decoupled from the mechanical damping arrangement.

18. The measurement stand according to claim 17, wherein a pivot lever mechanism, a cam-follower mechanism, a steep-threaded spindle or a cam disc is provided between the motor and the carriage and transmits the drive movement of the motor to a movement of the carriage.

19. The measurement stand according to claim 10, wherein the motor is provided as a rotary magnet motor, which comprises a return spring.

20. A method for electrically activating a measurement stand with a movement of at least one measuring probe from a starting position into a measuring position, in order to measure the thickness of thin layers,
   in which a motor is activated by a control arrangement, which moves a ram up and down via a drive arrangement, wherein a retainer is provided on the ram, to which retainer the measuring probe can be fastened,
   in which a freewheel is activated between the drive arrangement and the ram as soon as the measuring probe or retainer is set down in the measuring position on an item to be measured, and the movement of the drive arrangement is decoupled from the vertical movement of the ram,
   wherein a movement speed of the at least one measuring probe from the starting position into the measuring position is reduced by an electrical damping before the measuring position is reached, and
   wherein the reduced movement speed compared with a first movement speed from the starting position is activated within an adjustable damping region.

21. The method according to claim 20, wherein the electrical damping is activated by a voltage change in order to activate the motor or by a short circuit from the control arrangement or by a rotational speed change from a high rotational speed to a low rotational speed of the motor.

22. The method according to claim 20, wherein the electrical damping is initiated by a signal of a sensor, which signal determines the start of the damping region, which is positioned between an upper end switch arranged in the starting position and a measuring position of the measuring probe.

23. The method according to claim 22, wherein a switching element, is positioned on the ram, by means of which switching element the damping is activated as said switching element runs past the sensor.

24. The method according to claim 22, wherein the damping region is delimited by a lower end switch of the drive arrangement or by a predetermined period of time with the reduced movement speed.

25. A measurement stand for supporting a measuring probe, for measuring the thickness of thin layers on an item to be measured, which measurement stand is intended to carry out the method according to claim 20, comprising a measuring table and a housing, which is arranged above the measuring table and in which a drive arrangement is provided, which activates a vertical movement of a ram from a starting position into a measuring position and is driven by a motor by means of a control arrangement, comprising a retainer, which is arranged on the ram and in which the measuring probe can be fastened, comprising a freewheel, which is provided between the drive arrangement and the ram, by means of which freewheel the movement of the drive arrangement is decoupled from the vertical movement of the ram in the event of setdown of the measuring probe or the retainer in a measuring position on the item to be measured, wherein a movement speed of the drive arrangement is reduced by electrical damping before the measuring position of the measuring probe is reached.

26. The measurement stand according to claim 25, wherein the electrical damping is activated by the control arrangement, which changes the rotational speed of the motor or the voltage for activation of the motor.

27. The measurement stand according to claim 25, wherein a sensor is provided between a starting position and a measuring position of the ram, by means of which sensor a control signal for activation of the electrical damping is output to the control arrangement when a switching element, which is fastened to the ram, runs through a vertical movement of the ram.

28. The measurement stand according to claim 27, wherein the sensor is changed in terms of the position thereof along the path of movement of the ram, and the size of the damping region is adjusted.

* * * * *